United States Patent [19]

Sammells et al.

[11] 4,235,955
[45] Nov. 25, 1980

[54] SOLID STATE PHOTOELECTROCHEMICAL CELL

[75] Inventors: Anthony F. Sammells; Peter G. P. Ang, both of Naperville, Ill.

[73] Assignee: Institute of Gas Technology, Chicago, Ill.

[21] Appl. No.: 84,641

[22] Filed: Oct. 15, 1979

Related U.S. Application Data

[63] Continuation-in-part of Ser. No. 23,541, Mar. 26, 1979.

[51] Int. Cl.³ .............................................. H01M 6/30
[52] U.S. Cl. ................................................... 429/111
[58] Field of Search ......................................... 429/111

[56] References Cited
U.S. PATENT DOCUMENTS 4,119,768 10/1978 Bayard ................................ 429/111

Primary Examiner—Aaron Weisstuch
Attorney, Agent, or Firm—Thomas W. Speckman

[57] ABSTRACT

A solid state photoelectrochemical cell providing in-situ electrochemical energy storage having a homogeneous solid electrolyte matrix and associated ionic conductors with a central electrolyte separator portion providing ionic conductance and an oxidant portion on one side and a reductant portion on the other side each having redox couples in fixed lattice positions and possessing ionic and electronic conductivity. At least one photosensitive photoelectrode is in ionic communication with the oxidant and/or reductant portion(s) whereby electrons or electron holes are transmitted to that portion while the photoelectrode is illuminated causing oxidation or reduction of the redox couple. The apparatus and process provide conversion of solar to electrical energy using a solid state photoelectrochemical cell.

25 Claims, 1 Drawing Figure

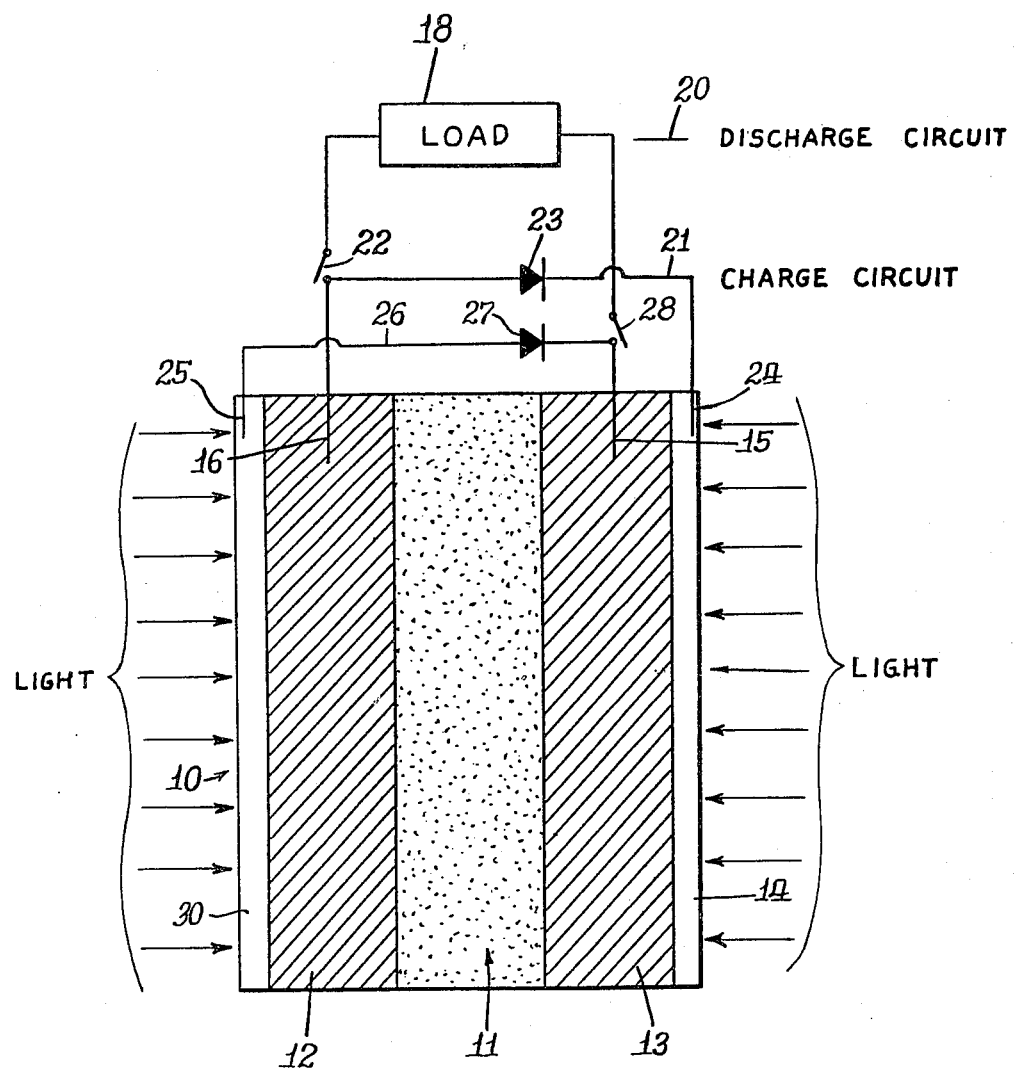

SOLID STATE PHOTOELECTROCHEMICAL CELL

CROSS REFERENCE TO RELATED APPLICATION

This application is a continuation-in-part of our co-pending application Ser. No. 23,541, filed Mar. 26, 1979.

BACKGROUND OF THE INVENTION

1. Field of the Invention

This invention relates to apparatus and process for conversion of solar to electrical energy using a solid state photoelectrochemical cell. Particularly, this invention provides a solid state photoelectrochemical cell having insitu electrochemical energy storage. The conversion of solar to electrical energy may be carried out using a homogeneous solid electrolyte matrix crystal lattice structure having a central electrolyte separator portion providing ionic conductance, an oxidant portion having first redox couples in fixed lattice positions on one side of the separator portion and a reductant portion having second redox couples in fixed lattice positions on the other side of the separator portion, both the oxidant and reductant portions possessing electronic and ionic conductivity; at least one photosensitive photoelectrode in ionic communication with the oxidant and/or reductant portions whereby electrons or electron holes are transmitted to the reductant or oxidant portion, respectively, while the at least one photoelectrode is illuminated; an external rectified electrical circuit between the semiconductor and its counterelectrode for charging; and an external loaded electrical circuit for withdrawal of electrical energy from the oxidant and reductant portions.

2. Description of the Prior Art

The direct conversion of solar energy to electricity can be achieved by solid state photovoltaic cells, such as those using silicon solar arrays. While such direct conversion has been viable for specialized application, the costs have been too high for acceptance for general electricity generation. Additionally, storage of electricity generated by the solid state photovoltaic cells has presented both technical and economic problems. The electricity storage has been generally performed by use of large storage batteries. Attempts are continuing to arrive at advanced battery systems which would provide technical and economic viability for such storage. Another method of conversion of solar energy to electrical energy in a single device is the photoelectrogenerative cell suggested by U.S. Pat No. 4,037,029 wherein an electrolytic cell anolyte contains photoelectrogenerative materials.

U.S. Pat. No. 4,021,323 teaches the conversion of solar energy to electrical energy by using solid state photovoltaic generators to electrolyze an electrolyte thereby producing hydrogen for use in a fuel cell for production of electrical energy.

SUMMARY OF THE INVENTION

This invention relates to a solid state photoelectrochemical cell comprising a homogeneous solid electrolyte matrix having layer or tunnel crystal lattice structure accommodating a high concentration of mobile ionic conductors beyond that required for nominal ionic conductivity forming a central electrolyte separator portion providing ionic conductance, an oxidant portion having first redox couples in fixed lattice positions on one side of said separator portion and a reductant portion having second redox couples in fixed lattice positions on the other side of said separator portion. A photosensitive n-type or p-type or both n-type and p-type semiconductor photoelectrode(s) is (are) in ionic communication, respectively, with the oxidant or reductant portions whereby electron holes or electrons are transmitted to the oxidant or reductant portion, respectively, while the photoelectrode(s) is (are) illuminated. The redox electrolyte portions have an equilibrium potential between the semiconductor decomposition potential and the conduction band edge when an n-type semiconductor is used and an equilibrium potential between the semiconductor decomposition potential and the valence band edge when a p-type semiconductor is used. An external rectified electrical circuit is provided between the semiconductor and its counterelectrode for charging during illumination and an external loaded electrical circuit is provided for withdrawal of electrical energy from the oxidant and reductant portions.

This invention also relates to a process for conversion of solar energy to electrical energy using a solid state photoelectrochemical cell having a homogeneous solid electrolyte matrix having a layer or tunnel type crystal lattice structure accommodating a high concentration of mobile ionic conductors beyond that required for nominal ionic conductance forming a central electrolyte separator portion providing ionic conductance and two end portions in contact therewith providing ionic and electronic conductance, an oxidant redox portion on one side and a reductant redox portion on the other side of said central separator portion, comprising the steps of illuminating an n-type or a p-type or both an n-type and a p-type semiconductor photosensitive photoelectrode(s), thereby generating electrons and electron holes; passing the electron holes or electrons to the oxidant or reductant portion, respectively, of a homogeneous solid electrolyte matrix crystal lattice structure and oxidizing or reducing, respectively, a redox couple in a fixed lattice position therein, the redox electrolyte portions having an equilibrium potential between the semiconductor decomposition potential and the conduction band edge when an n-type semiconductor is used and an equilibrium potential between the semiconductor decomposition potential and the valence band edge when a p-type semiconductor is used; passing the ionic charge resulting from the oxidation or reduction through the separator portion to the other side portion by the mobile ions; passing electrical charge through a fully rectified external circuit means between the semiconductor and its counterelectrode in the same direction to movement of ionic charge through the separator portion for charging the cell during illumination; and passing electrical charge through an external loaded electrical circuit means for withdrawal of electrical energy from the oxidant and reductant portions.

It is an object of this invention to provide apparatus and process for conversion of solar energy to electrical energy having advantages not found in prior processes.

It is another object of this invention to provide a solid state photoelectrochemical cell for conversion of solar energy to electrical energy.

It is yet another object of this invention to provide a solid state photoelectrochemical cell having in-situ electrochemical energy storage.

It is still another object of this invention to provide a process for conversion of solar energy to electrical energy utilizing a solid state photoelectrochemical cell which provides in-situ electrochemical energy storage.

BRIEF DESCRIPTION OF THE DRAWING

These and other objects, advantages and features of this invention will be apparent from the description together with the drawing wherein:

The FIGURE schematically shows one embodiment of a solid state photoelectrochemical cell of this invention together with its associated external charging and discharging circuits.

DESCRIPTION OF THE PREFERRED EMBODIMENTS

The FIGURE shows one embodiment of a solid state photoelectrochemical cell of this invention. The embodiment shown in the FIGURE has an n-type semiconductor 14 deposited on the exterior face of oxidant electrode portion 13 and a p-type semiconductor 30 deposited on the exterior face of reductant electrode portion 12. Central electrolyte separator portion 11 separates reductant electrode portion 12 from oxidant electrode portion 13. Reductant electrode portion 12, electrolyte separator portion 11 and oxidant electrode portion 13 each are a homogeneous solid crystal lattice structure. Oxidant portion 13 and reductant portion 12 each contain redox couples introduced into fixed lattice positions where they will be immobile. Oxidant portion 13 and reductant portion 12 possess both ionic and electronic conductivity while electrolyte separator portion 11 has only ionic conductivity. Oxidation of the first redox couple in oxidant portion 13 occurs upon illumination of n-type semiconductor 14 and a corresponding reduction reaction of the second redox couple occurs in reductant portion 12. Likewise, reduction of the second redox couple in reductant portion 12 occurs upon illumination of p-type semiconductor 30 and a corresponding oxidation reaction of the first redox couple occurs in oxidant portion 13. The ability to accommodate a large concentration of mobile cations, in both central electrolyte portion 11 and the reductant and oxidant portions 12 and 13, which are available for conduction processes over and above that required to provide acceptable nominal ionic conductivity results in electronic charge neutrality being maintained during both the charge and discharge mode without chemical phase changes taking place at the electrodes. While the FIGURE shows both n-type semiconductor 14 and p-type semiconductor 30, the apparatus and process of this invention includes only one semiconductor being present, either the n-type or p-type. When only one semiconductor is used, it is preferred to use an n-type semiconductor. In such cases, the drawing is only changed by the absence of one semiconductor layer and its corresponding charge circuit.

To achieve the good optical and electrical properties desired of the solid state photoelectrochemical cell, the following criteria are desired: The semiconductor should have a band gap preferably less than about 2.2 eV, the density of charge carriers within the space charge region should be about $10^{16}$ carriers/cm$^3$ with a space charge layer having a depth approximately proportional to the reciprocal of the absorption coefficient, the equilibrium potentials of the first and second redox couples should be between the semiconductor decomposition potential and the conduction band edge for the n-type semiconductor and between the semiconductor decomposition potential and valence band edge for the p-type semiconductor, and the current-voltage characteristics of the redox couples generated should provide favorable kinetics.

The FIGURE shows the external charge and discharge electrical circuits between the semiconductor and its counterelectrode and between oxidant and reductant electrode portions, respectively. The external charge circuits carry electricity between the semiconductor and its counterelectrode with external electrical circuit switches 22 and 28 providing on-off connection to discharge circuit 20. Charge circuits 21 and 26 include fully rectifying diodes 23 and 27. Discharge circuit 20 may be activated by switches 22 and 28 putting load 18 into the circuit between reductant portion 12 and oxidant portion 13 for conventional discharge. Oxidant portion electrode contact 15 and reductant portion electrode contact 16 provide electrical contact with oxidant portion 13 and reductant portion 12 and the external charge and discharge circuits. It is readily apparent that when only n-type semiconductor 14 is used charge circuit 21 is not necessary and when only p-type semiconductor 30 is used charge circuit 26 is not necessary.

The reaction for the cell as shown in the FIGURE may be described as follows:

During Charge:

PHOTOLYTIC REACTION hr→h$^+$ +e$^-$ on semiconductor-electrolyte interface

AT OXIDANT ELECTRODE

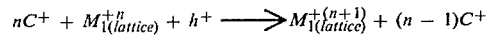

AT REDUCTANT ELECTRODE

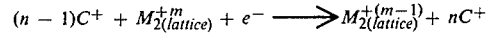

wherein:

M$_1$ represents a first redox couple substituted in lattice positions which is oxidized by an electron hole h$^+$;
C$^+$ represents a mobile ion conductor; and
M$_2$ represents a second redox couple substituted in lattice positions which is reduced by an electron e$^-$.

Electrode neutrality is preserved by migration of mobile ions through the electrolyte.

During Discharge:

OVERALL REACTION DURING DISCHARGE

The above equations relate to an n-type semiconductor photoanode adjacent the oxidant electrode portion of the solid state photoelectrochemical cell. Instead of the n-type semiconductor, a p-type semiconductor photocathode may be located adjacent the reductant electrode portion 12. Use of the p-type semiconductor results in similar reactions and charge flows as shown above. Both n-type and p-type semiconductors can be used simultaneously to increase overall solar efficiency, the n-type semiconductor in ionic communication with the oxidant electrolyte portion and the p-type semiconductor in ionic communication with the reductant electrolyte portion. The n-type semiconductor and p-type semiconductor are simultaneously illuminated.

Suitable materials for use in the the n-type semiconductor of the photoelectrode assembly of this invention include: $Fe_2O_3$, ZnTe, $WO_3$, $MoS_2$, $MoSe_2$, $TiO_2$, $MTiO_3$, where M is a transition metal element or rare-earth metal element, $TiO_2$ heavily doped with compensated donor-acceptor pairs such as $Ni^{2+}$—$Sb^{5+}$, $Co^{2+}$—$Sb^{5+}$, etc., Si, Te, SiC, CdS, CdSe, CdTe, ZnSe, GaP, GaAs, InP, AlAs, AlSb, GaSb, $Cd_{1-x}Zn_xS$, $GaAs_xP_{1-x}$, $GaIn_{1-x}As$, $Al_xGa_{1-x}As$, Chalcopyrites, $CuInS_2$, $AgInSe_2$, $AgInS_2$, $CuInSe_2$, $ZnSiP_2$, $CdSiP_2$, $CdSnP_2$, $CdSnAs_2$ and polyacetylene. The above chemicals must be appropriately doped with at least one n-type material, as is known to the art, for production of the n-type semiconductor. GaAs, CdSe, $MoS_2$, Si, $MoSe_2$ and $Fe_2O_3$ appropriately doped to make them n-type semiconducting materials are preferred and GaAs, $Fe_2O_3$, CdSe and Si are especially preferred as the n-type semiconductor electrode for use in this invention.

Suitable materials for use in the p-type semiconductor of the photoelectrode for use in the cell of this invention include $Cu_2O$, $Cu_2S$, Si, Ge, SiC, CdTe, ZnTe, GaP, GaAs, InAs, AlAs, AlSb, GaSb, InP, Chalcopyrites, $CuInS_2$, $CuGaS_2$, $CuAlS_2$, $CuAlSe_2$, $CuInSe_2$, $ZnSiAs_2$, $ZnGeP_2$, $ZnSnAs_2$, $ZnSnP_2$, $ZnSnSb_2$, $CdSnP_2$ and $CdSnAs_2$. The above chemicals must be appropriately doped with at least one p-type material, as is known to the art, for production of the p-type semiconductor. GaP, GaAs, ZnTe, CdTe, InP, SiC and Si appropriately doped to make them p-type semiconducting materials are preferred.

It is desired that the semiconductor electrode have band gaps in the order of about 1 to about 2.5 eV to provide increased solar energy conversion efficiencies, and preferably less than about 2.2 eV. Further, the semiconductor must be stable with respect to the electrolyte-redox species with which it is in contact. Both monocrystalline and polycrystalline semiconductor materials may be used in the photoelectrode of the solid state photoelectrochemical cell of this invention. Stability of the semiconductor, with respect to the electrolyte-redox species in contact with it, may be increased by introduction of a deposited transparent wide band-gap material to form a heterostructure.

Suitable solid crystal lattice structures are those having a layer or tunnel type crystal structure which are able to accommodate a high concentration of mobile ionic carriers. The solid crystal lattice structures must accommodate introduction of acceptor and donor redox species into fixed lattice position. Such materials accommodate a large concentration of mobile cations which are available for conduction beyond that required for nominal ionic conductivity. Electrochemical energy storage is effected in-situ in the reductant and oxidant electrode portion. Suitable solid crystal lattice structures and associated ionic conductors are alkali ion conductors such as lithium ion conductors, $Li_4SiO_4$ doped with $Li_3PO_4$ or $Li_5AlO_4$ to increase lithium ion conductivity and sodium ion conductors $Na_2O.11Al_2O_3$ and $Na_3Zr_2Si_2PO_{12}$; silver ion conductors $RbAg_4I_5$; copper ion conductors such as double salts of substituted organic ammonium halides; halide ion conductors such as $PbF_2$; and solid oxide conductors such as stabilized (doped with yttrium) $ZrO_2$. Preferred are $Na_2O.11Al_2O_3$ and substituted $Li_4SiO_4$.

In the case of the solid crystal lattice structure beta-$Al_2O_3$, the lattice contains a hexagonal layer-type structure of spinel-type blocks containing four layers of cubic close-packed oxygen atoms with ions occupying all of the sites normally occupied by the aluminum and magnesium ions in the $MgAl_2O_4$ spinel. The nominal formula is $Na_2O.11Al_2O_3$, but the sodium content can vary. An excess of sodium ions is usually present between spinel blocks separated by Al-O-Al bonds. The mobility of these sodium ions results in high ionic conductivity, which can be $8\times10^{-3}\Omega^{-1}cm^{-1}$ at room temperature. The ability of the beta-$Al_2O_3$ structure to accommodate varying concentration of sodium ions enables electroneutrality to be achieved in the oxidant and reductant electrodes so that oxidation and reduction reactions of the substituted redox couples will occur reversibly.

In the reductant and oxidant portions of the lattice structure, redox couples are substituted into lattice positions where they are available for taking part in a reversible redox reaction. The basic requirement of the redox oxidant electrolyte in contact with the n-type semiconductor is that it have an equilibrium potential more negative than the decomposition potential of the n-type semiconductor and more positive than the edge of the conduction band of the n-type semiconductor. The basic requirement of the reductant electrolyte is that its redox couple have an equilibrium potential negative of the oxidant electrolyte and more positive than the edge of the conduction band of the n-type semiconductor. When the p-type semiconductor is used in contact with the reductant electrolyte the equilibrium potentials must relate to the p-type semiconductor properties, the redox equilibrium potentials being between the semiconductor decomposition potential and valence band edge of the p-type semiconductor. These principles are more fully set forth in H. Gerischer, "The Photoelectrochemical Cell: Principles, Energetics and Electrode Stability", in "Semiconductor Liquid-Junction Solar Cells" (A. Heller, ed.) The Electrochem. Soc., Inc., Princeton, N.J. page 1, 1977.

In the case of beta-alumina lattice structure, for example, the redox couple is substituted into $Al^{+3}$ lattice positions where they are available for reversible redox reactions. Suitable redox couples include $Cu^+/Cu^{+2}$, $Fe^{+2}/Fe^{+3}$, $Co^{+2}/Co^{+3}$, $Cr^{+2}/Cr^{+3}$, $Ti^{+3}/Ti^{+4}$ and $Ni^{+2}/Ni^{+3}$. Selected redox dopants for substitution into the lattice sites can be chosen from first and second transition series, for species capable of a reversible oxidation reduction reaction. Preferred n-type semiconductors and redox couple combinations include: GaAs with $Cu^+/Cu^{+2}$ and $Cr^{+2}/Cr^{+3}$ and $Fe_2O_3$ with $Fe^{+2}/Fe^{+3}$ and $Ti^{+3}/Ti^{+4}$ and Si with $Fe^{+2}/Fe^{+3}$ and $Ti^{+3}/Ti^{+4}$.

The degree of lattice substitution and how the substitution is effected as well as details of fabrication of the cells is not a part of the present invention and was known to one skilled in the art as, for example, more completely set forth in the publications "Galvanic Cells Containing Cathodes of Iron-Doped Beta-Alumina" by John Kennedy and Anthony F. Sammells, Journal of the Electrochemical Society, 121, 1, (1974); "A Solid-State Electrochemical Cell Based on Ion Conductive Ceramics" by K. O. Hever, Journal of the Electrochemical Society 115, 830, (1968); and in the publication "Solid Electrolytes" edited by S. Geller, Springer-Verlag, New York (1977).

The ionic carriers are in a concentration of about $10^{21}$ to $10^{22}$ ions per cubic centimeter.

The manner of fabrication of cells of this invention will be apparent to one skilled in the art in view of the above disclosure. The thickness of the electrolyte portions and cell geometry may be optimized for specific semiconductors, redox couples and matrices with their associated conductors in view of the above disclosure. The thickness of the oxidant and reductant portions is governed by the desired capacity of the cell; generally they are about 0.1 to about 1 centimeter in thickness, about 0.4 to about 0.6 centimeters being preferred. The electrolyte thickness is desired to be as thin as possible to provide low resistance while obtaining mechanical stability. Generally, the electrolyte thickness for cells of this invention is about 1 micron to about 1 millimeter.

The cells of this invention may be fabricated from three separate components: the oxidant electrode portion doped with an appropriate redox couple; the undoped electrolyte separator portion; and the reductant electrode portion doped with an appropriate redox couple. The three portions are assembled and rapidly heated to fuse. It is desirable to have the assembly reach sintering temperature rapidly and to be retained at a sintering temperature only for a short period of time to prevent the substituted redox couples from migrating into the electrolyte separator to any substantial extent. For example, in the case of beta-$Al_2O_3$, the assembly may be placed in a preheated furnace at about 1200° C. for about 10 to 60 minutes. A cell fabricated in this fashion provides ionic conductance by the central electrolyte separator portion and ionic and electrical conductance by the oxidant and reductant portions. The central electrolyte separator portion is in direct and ionic contact with each of the oxidant and reductant portions. The semiconductor may be applied to the outside surface of the oxidant and/or reductant portion(s) as a thin film by sputtering or thermal vacuum evaporation as is more fully disclosed in the Handbook of Thin Film Technology by L. Maissel and R. Glang (1971). The semiconductor layer generally has a thickness of about 1 $\mu$m to about 1 mm and the thicker semiconductor layers should allow light to reach the semiconductor-electrolyte interface.

Using semiconductors and redox species disclosed, a system may be achieved for conversion of solar energy into electricity providing individual cell potential at AMI incident flux of 0.5 V with a current density of about 20 mA/cm$^2$ providing 1 watt power output using a collector array area of about 100 cm$^2$. It should be apparent that the photoelectrochemical cells of this invention may be used in multiples forming collector arrays providing desired power output.

The following specific example is set forth for exemplary purposes and should not be used to limit the invention in any way.

EXAMPLE

Solid crystal lattice material of beta-alumina having a sintered density sixty percent or greater of its theoretical value is used. One of the 1 mm thick electrodes is doped with $Fe^{+2}/Fe^{+3}$ by substitution of the iron into $Al^{+3}$ lattice positions by direct solid state synthesis from $Fe_2O_3$, $Al_2O_3$ and $Na_2CO_3$ at 1100° C. where approximately 50 percent of the $Al^{+3}$ sites are substituted by $Fe^{+3}$. The first electrode is fabricated by pressing followed by sintering at 1400° C. Likewise, the other 1 mm thick electrode is doped with $Ti^{+3}/Ti^{+4}$ in an analogous manner to the first electrode to provide a second electrode. The ionic carriers have a concentration of about $5 \times 10^{21}$ ions per cubic centimeter. The cell is assembled with the electrolyte separator portion, about 10$\mu$ thick, between the electrodes and placed in a furnace at 1200° to 1600° C. for 10 to 60 minutes to fuse the components together. After cooling, $Fe_2O_3$ appropriately doped for n-type semiconductor is applied to the outer surface of the oxidant electrode portion by directly sputtering $Fe_2O_3$ and the direct vacuum evaporation of Fe followed by oxidation.

A charge circuit with a fully rectifying diode as shown in the FIGURE is connected between the reductant electrode and the n-type semiconductor and a discharge circuit with an electrical load is connected between the reductant electrode and the oxidant electrode.

The semiconductor is illuminated with full sunlight for 6 hours with the charge circuit closed fully charging the cell by storage of energy in the redox couples substituted in the lattice positions of the oxidant and reductant electrodes. The external discharge circuit with an electric motor load is connected for withdrawal of electrical energy. Twenty mWh electrical energy is withdrawn.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A solid state photoelectrochemical cell comprising:
   a homogeneous solid electrolyte matrix having a layer or tunnel crystal lattice tape structure accommodating a high concentration of mobile ionic conductors beyond that required for nominal ionic conductivity forming a central electrolyte sparator portion providing ionic conductance, an oxidant portion having first redox couples in fixed lattice positions on one side of said separator portion and a reductant portion having second redox couples in fixed lattice position on the other side of said separator portion;
   a photosensitive n-type or p-type or both n-type and p-type semiconductor photoelectrodes in ionic communication, respectively, with said oxidant and/or reductant portions whereby electron holes or electrons are transmitted to said oxidant or reductant portions, respectively, while said photoelectrode is illuminated, the redox electrolyte portions having an equilibrium potential between the semiconductor decomposition potential and the conduction band edge when an n-type semiconductor is used and an equilibrium potential between the semiconductor decomposition potential and the valence band edge when a p-type semiconductor is used;
   external rectified electrical circuit means between said semiconductor and its counterelectrode for charging during illumination; and
   external loaded electrical circuit means for withdrawal of electrical energy from said oxidant and reductant portions.

2. The solid state photoelectrochemical cell of claim 1 wherein said solid electrolyte matrix and associated ionic conductors is selected from the group consisting of alkali ion conductors, silver ion conductors, copper ion conductors, halide ion conductors, and oxide ion conductors.

3. The solid state photoelectrochemical cell of claim 1 wherein said solid electrolyte matrix and associated ionic conductors is selected from the group consisting of $Li_4SiO_4$ doped with $Li_3PO_4$ or $Li_5AlO_4$, $Na_2O.11Al_2O_3$, $Na_3Zr_2Si_2PO_{12}$, $RbAg_4I_5$, copper double salts of organic ammonium halides, $PbF_2$ and stabilized zirconia.

4. The solid state photoelectrochemical cell of claim 1 wherein said solid electrolyte matrix and associated ionic conductor is sodium ion conductor beta-alumina.

5. The solid state photoelectrochemical cell of claim 1 wherein said photoelectrode is an n-type semiconductor in ionic communication with said oxidant portion.

6. The solid state photoelectrochemical cell of claim 5 wherein said n-type semiconductor is selected from the group consisting of GaAs, CdSe, Si, $MoS_2$, $MoSe_2$ and $Fe_2O_3$ appropriately doped with at least one n-type material.

7. The solid state photoelectrochemical cell of claim 6 wherein said n-type semiconductor is selected from the group consisting of GaAs, CdSe, Si and $Fe_2O_3$.

8. The solid state photoelectrochemical cell of claim 1 wherein said photoelectrode is a p-type semiconductor in ionic communication with said reductant portion.

9. The solid state photoelectrochemical cell of claim 8 wherein said p-type semiconductor is selected from the group consisting of GaP, GaAs, ZnTe, CdTe, InP, SiC and Si appropriately doped with at least one p-type material.

10. The solid state photoelectrochemical cell of claim 1 wherein said redox couples are selected from the group consisting of $Cu^+/Cu^{+2}$, $Fe^{+2}/Fe^{+3}$, $Co^{+2}/Co^{+3}$, $Cr^{+2}/Cr^{+3}$, $Ti^{+3}/Ti^{+4}$ and $Ni^{+2}/Ni^{+3}$.

11. The solid state photoelectrochemical cell of claim 1 wherein said photoelectrode is an appropriately doped n-type semiconductor in ionic communication with said oxidant portion, the n-type semiconductor and redox couple combination selected from the group consisting of GaAs with $Cu^+/Cu^{+2}$ and $Cr^{+2}/Cr^{+3}$ and $Fe_2O_3$ with $Fe^{+2}/Fe^{+3}$ and $Ti^{+3}/Ti^{+4}$ and Si with $Fe^{+2}/Fe^{+3}$ and $Ti^{+3}/Ti^{+4}$.

12. The solid state photoelectrochemical cell of claim 1 wherein said photoelectrodes comprise an n-type semiconductor in ionic communication with said oxidant portion and a p-type semiconductor in ionic communication with said reductant portion.

13. A process for conversion of solar energy to electrical energy using a solid state photoelectrochemical cell having a homogeneous solid electrolyte matrix having layer or tunnel crystal lattice structure accommodating a high concentration of mobile ionic conductors beyond that required for nominal ionic conductance forming a central electrolyte separator portion providing ionic conductance and two end portions in contact therewith providing ionic and electrical conductance, an oxidant redox portion on one side and a reductant redox portion on the other side of said central separator portion, comprising the steps:

illuminating an n-type or a p-type or both n-type and p-type semiconductor photosensitive photoelectrodes in ionic communication, respectively, with said oxidant and/or reductant portions, thereby generating electrons and electron holes;

passing said electron holes and electrons to the oxidant or reductant portion, respectively, of a homogeneous solid electrolyte matrix crystal lattice structure and oxidizing or reducing, respectively, a redox couple in a fixed lattice position therein, the redox electrolyte portions having an equilibrium potential between the semiconductor decomposition potential and the conduction band edge when an n-type semiconductor is used and an equilibrium potential between the semiconductor decomposition potential and the valence band edge when a p-type semiconductor is used;

passing the ionic charge resulting from said oxidation or reduction through said separator portion to the other side portion by said mobile ions;

passing electrical charge through a fully rectified external circuit means between the semiconductor and its counterelectrode in the same direction to movement of said ionic charge through said separator portion for charging the cell during illumination; and passing electrical charge through an external loaded electrical circuit means for withdrawal of electrical energy from said oxidant and reductant portions.

14. The process of claim 13 wherein said solid electrolyte matrix and associated ionic conductors is selected from the group consisting of alkali ion conductors, silver ion conductors, copper ion conductors, halide ion conductors and oxide ion conductors.

15. The process of claim 13 wherein said solid electrolyte matrix and associated ionic conductors is selected from the group consisting of $Li_4SiO_4$ doped with $Li_3PO_4$ or $Li_5AlO_4$, $Na_2O.11Al_2O_3$, $Na_3Zr_2Si_2PO_{12}$, $RbAg_4I_5$, copper double salts or organic ammonium halides, $PbF_2$ and stabilized zirconia.

16. The process of claim 13 wherein said solid electrolyte matrix and associated ionic conductor is sodium ion conductor beta-alumina.

17. The process of claim 13 wherein said photoelectrode is an n-type semiconductor in ionic communication with said oxidant portion.

18. The process of claim 17 wherein said n-type semiconductor is selected from the group consisting of GaAs, CdSe, $MoS_2$, $MoSe_2$, Si and $Fe_2O_3$ appropriately doped with at least one n-type material.

19. The process of claim 18 wherein said n-type semiconductor is selected from the group consisting of GaAs, Si, CdSe and $Fe_2O_3$.

20. The process of claim 13 wherein said photoelectrode is a p-type semiconductor in ionic communication with said reductant portion.

21. The process of claim 20 wherein said p-type semiconductor is selected from the group consisting of GaP, GaAs, ZnTe, CdTe, InP, SiC and Si appropriately doped with at least one p-type material.

22. The process of claim 13 wherein said redox couples are selected from the group consisting of $Cu^+/Cu^{+2}$, $Fe^{+2}/Fe^{+3}$, $Co^{+3}$, $Cr^{+2}/Cr^{+3}$, $Ti^{+3}/Ti^{+4}$ and $Ni^{+2}/Ni^{+3}$.

23. The process of claim 13 wherein said photoelectrode is an appropriately doped n-type semiconductor in ionic communication with said oxidant portion, the n-type semiconductor and redox couple combination selected from the group consisting of GaAs with $Cu^+/Cu^{+2}$ and $Cr^{+2}/Cr^{+3}$ and $Fe_2O_3$ with $Fe^{+2}/Fe^{+3}$ and $Ti^{+3}/Ti^{+4}$ and Si with $Fe^{+2}/Fe^{+3}$ and $Ti^{+3}/Ti^{+4}$.

24. The process of claim 13 wherein said illumination is provided by solar radiation.

25. The process of claim 13 wherein an n-type semiconductor photoelectrode in ionic communication with said oxidant portion and a p-type semiconductor photoelectrode in ionic communication with said reductant portion are simultaneously illuminated.

* * * * *